United States Patent
Selway et al.

(10) Patent No.: US 11,025,599 B2
(45) Date of Patent: Jun. 1, 2021

(54) SYSTEM AND METHOD FOR ENCRYPTING A DATA ALERT

(71) Applicant: Early Warning Services, LLC, Scottsdale, AZ (US)

(72) Inventors: Anthony J. Selway, Phoenix, AZ (US); Matthew J. Cottrell, Phoenix, AZ (US); Laura E. Weinflash, Scottsdale, AZ (US); Robert W. Weyrauch, Maricopa, AZ (US)

(73) Assignee: EARLY WARNING SERVICES, LLC, Scottsdale, AZ (US)

( * ) Notice: Subject to any disclaimer, the term of this patent is extended or adjusted under 35 U.S.C. 154(b) by 222 days.

(21) Appl. No.: 16/123,723

(22) Filed: Sep. 6, 2018

(65) Prior Publication Data

US 2019/0020635 A1    Jan. 17, 2019

Related U.S. Application Data

(63) Continuation-in-part of application No. 13/451,039, filed on Apr. 19, 2012, now abandoned.

(60) Provisional application No. 61/477,096, filed on Apr. 19, 2011.

(51) Int. Cl.
| | |
|---|---|
| *G06Q 40/00* | (2012.01) |
| *H04L 29/06* | (2006.01) |
| *G06F 21/60* | (2013.01) |
| *H04L 9/08* | (2006.01) |
| *G06F 21/62* | (2013.01) |
| *G06Q 20/04* | (2012.01) |
| *G06Q 20/40* | (2012.01) |

(52) U.S. Cl.
CPC ........ *H04L 63/0442* (2013.01); *G06F 21/602* (2013.01); *G06F 21/6218* (2013.01); *G06Q 20/042* (2013.01); *G06Q 20/4016* (2013.01); *H04L 9/0825* (2013.01)

(58) Field of Classification Search
None
See application file for complete search history.

(56) References Cited

U.S. PATENT DOCUMENTS

| | | | |
|---|---|---|---|
| 7,337,953 B2 | 3/2008 | Sgambati et al. | |
| 7,383,227 B2 | 6/2008 | Weinflash et al. | |
| 7,566,002 B2 | 7/2009 | Love et al. | |
| 7,958,050 B2 | 6/2011 | Finch | |
| 8,109,435 B2 | 2/2012 | Mayo et al. | |
| 8,172,132 B2 | 5/2012 | Love et al. | |
| 8,351,678 B1 | 1/2013 | Medina, III | |
| 2007/0233614 A1 | 10/2007 | McNelley et al. | |
| 2008/0046368 A1* | 2/2008 | Tidwell | G06Q 20/40 705/44 |
| 2008/0294541 A1 | 11/2008 | Weinflash et al. | |
| 2009/0012889 A1 | 1/2009 | Finch | |
| 2009/0132393 A1 | 5/2009 | Weinflash | |
| 2009/0182653 A1 | 7/2009 | Zimiles | |

(Continued)

*Primary Examiner* — Olabode Akintola
(74) *Attorney, Agent, or Firm* — Kilpatrick Townsend & Stockton LLP

(57) ABSTRACT

A method and system for providing real-time encrypted data alerts over secure networks. The method and system detect the improper duplicate data records and generate alerts that indicate the improper duplication. The systems encrypt the data alerts and transmit them to remote devices over private, secure networks to protect sensitive data contained in the alerts.

20 Claims, 5 Drawing Sheets

(56) References Cited

U.S. PATENT DOCUMENTS

| | | |
|---|---|---|
| 2009/0313069 A1 | 12/2009 | Love et al. |
| 2011/0231312 A1 | 9/2011 | Finch |
| 2012/0101945 A1 | 4/2012 | Mayo et al. |
| 2012/0224763 A1* | 9/2012 | Wall .................. G06K 9/00986 382/137 |
| 2012/0260095 A1* | 10/2012 | Von Hauck ......... H04L 63/0869 713/176 |
| 2013/0013491 A1 | 1/2013 | Selway et al. |

* cited by examiner

SYSTEM AND METHOD FOR ENCRYPTING A DATA ALERT

CROSS-REFERENCE TO RELATED APPLICATIONS

This application is a continuation-in-part of U.S. patent application Ser. No. 13/451,039, filed Apr. 19, 2012, which claims priority to U.S. Provisional Patent Application No. 61/477,096, filed Apr. 19, 2011, the disclosures of which are incorporated by reference herein in their entireties.

BACKGROUND OF THE INVENTION

Entities operating computer systems that are interconnected over large networks typically process and store large amounts of data. Oftentimes, these entities operate at a number of locations. Given the number of locations involved, as well as the large amount of data being processed and stored, many times duplicate data records are processed and stored, which may lead to numerous problems. For example, the storage of duplicative information can put a strain on data processing equipment and may use up significant amounts of data storage. Moreover, the duplicative data may result in processing errors if the various computers in the network attempt to process the data normally, without knowing about the other copies of data. Duplicative data issues are even more likely as various entities allow users to interact with its network using their personal mobile devices, such as cellular phones and tablet computers. Unsophisticated users may input and submit data multiple times (intentionally or inadvertently) or otherwise cause duplicative data to be created.

BRIEF SUMMARY OF THE INVENTION

Embodiments of the invention provide systems and methods for identifying duplicate data records, as well as for providing secure alerts to entities regarding the presence of duplicative data in real time.

In one exemplary embodiment, a system for encrypting data alerts includes a remote source computing device, at least one remote recipient computing device, a private, secured network and an alert computing system. The private secured network may be configured to facilitate communication between the remote source computing device, the at least one remote recipient computing device, and the alert computing system. The alert computing system may include a communication interface configured to receive and transmit data over the private, secured network, a processing unit, and a memory that includes instructions stored thereon that when executed cause the processing unit to receive, using the communication interface, an encrypted data record over the private, secured network from the remote source computing device. The data record may be encrypted using one key of an asymmetric key pair. The instructions may further cause the processing unit to decrypt the encrypted data record using another key of the asymmetric key pair, retrieve, from the memory, previously stored data records, and parse the decrypted data record to identify a data string identifying an instrument. The instructions may also cause the processing unit to analyze the data string against data on the stored data records, generate an alert that indicates a likelihood of improper use associated with the data string, and identify at least one remote recipient device associated with the improper use. The instructions may cause the processing device to format the alert into a desired data format based on hardware and software capabilities of the at least one remote recipient computing device, encrypt the formatted alert using the one key of the asymmetric key pair, and transmit, using the communication interface, the encrypted formatted alert and the assessed risk over the private, secured network to the at least one remote recipient computing device. The alert may include a command that causes the alert to display on the at least one remote recipient computing device in real-time.

In another embodiment, a method for providing alerts over a network to a remote computing device is provided. The method may include receiving data records at a computer system sent from at least one institution data source over a network. The computer system may include a microprocessor and a memory that stores data preferences and alert preferences for each of the one or more institutions. The microprocessor may store the data records and filter the received data records by comparing each received data record to other data records stored at the computing system to determine if any data records are duplicative. The microprocessor may also generate an alert from the filtered data records that contains an institution identifier, which specifies a source of a particular duplicative data. The microprocessor may further determine that the duplicative data record is improper and transmit the alert over a network communication channel to at least one remote computing device associated with at least one of the one or more institutions based upon the data preferences and alert preferences. The alert may cause the alert to display on the at least one remote computing device.

In another embodiment, a system for providing alerts over a network to a remote computing device is provided. The system may include a network interface, at least one processing device, and at least one memory device. The at least one memory device may be configured to store data preferences and alert preferences for each of one or more institutions. The at least one memory device may include instructions that cause the at least one processing device to receive data records sent from at least one institution data source over a network using the network interface. The instructions may also cause the at least one processing device to store the data records and filter the received data records by comparing each received data record to other data records stored at the computing system to determine if any of the received data records are duplicative. The instructions may further cause the at least one processing device to generate an alert from the filtered data records that contains an institution identifier, which specifies a source of the duplicative data record. The instructions may cause the at least one computing device to assess a risk that the duplicative data record is improper and transmit, using the network interface, the alert and the assessed risk over a network communication channel to at least one remote computing device associated with at least one of the one or more institutions based upon the data preferences and alert preferences. The alert may cause the alert to display on the at least one remote computing device.

DETAILED DESCRIPTION OF THE INVENTION

Figure 1:
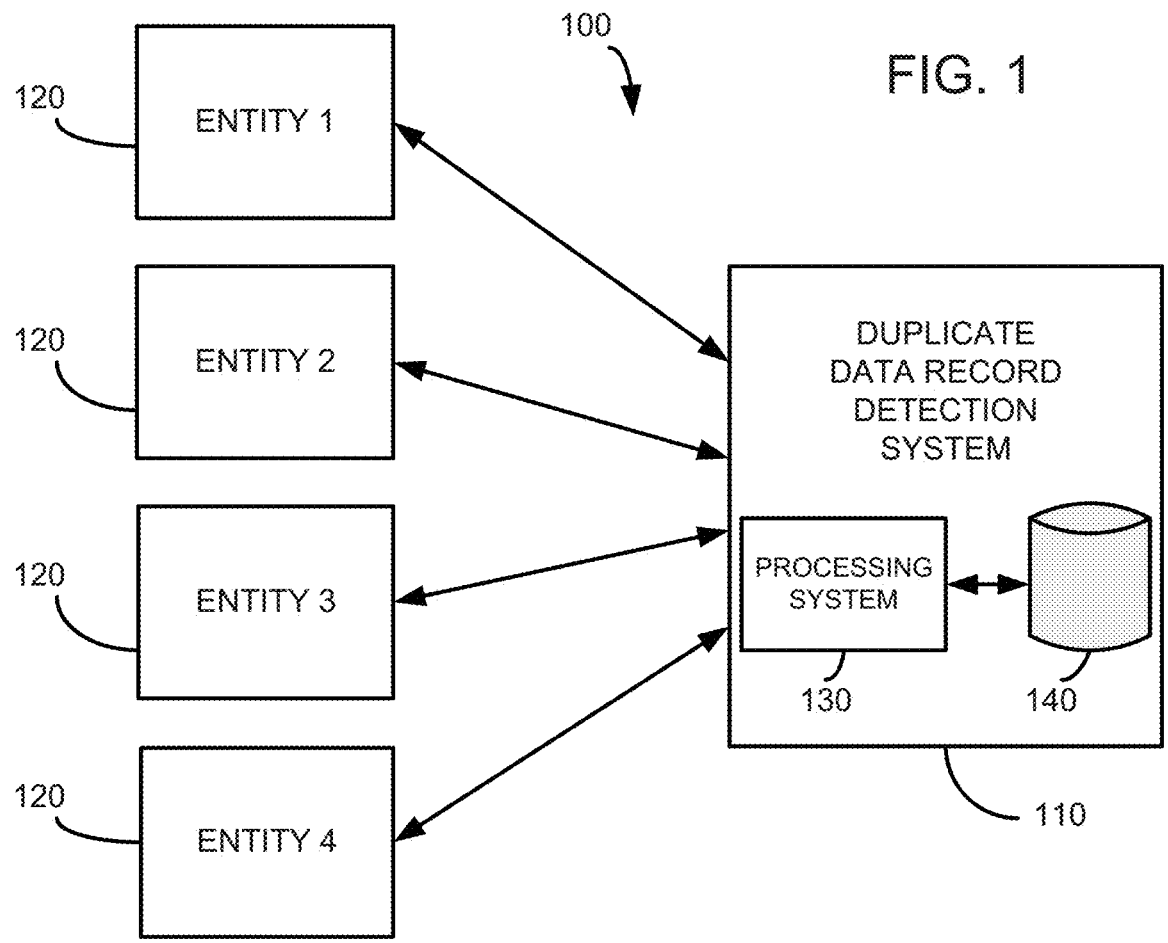
FIG. 1 is a block diagram illustrating a network in which a plurality of institutions are linked to a duplicate record detection system.

There are various embodiments for implementing the present invention. Generally speaking, embodiments of the invention reduce or mitigate improper duplicate records by detecting and identifying duplicative data records that are potentially improper and by transmitting alerts in real time to affected entities.

In some embodiments, businesses, colleges, and other entities provide a data records to a central or third party data storage system. The records may include any type of data, including data that identifies the data source, a time of the creation of the data record, other identification information of people or interactions with a particular entity, and/or any other type of data. The records are stored at the central system, and as new records are received from participating computer systems, each new record is compared to previous records to find any matches. Upon detecting duplicate entries, the system may determine whether it is likely that the duplicate entries are improper, and if so, the system may generate and transmit alerts that notify any affected entity that improper duplicative data has been detected. This provides each affected entity an opportunity to address any detected issues immediately.

The systems and methods described herein may also provide secure techniques for data transmission. Oftentimes, the data a particular entity may be communicating and/or storing may contain sensitive information. The alert systems of the present invention may require that all data records sent, received, and/or stored be encrypted. For example, the alert systems may encrypt and decrypt data records and alerts using asymmetric key pairs or using other encryption techniques. Additionally, communications with the alert system may be conducted exclusively using a private, secure network that has been established by and/or for use by the alert system and participating entities. Such features provide multiple levels of security to protect any sensitive information contained in the data records and/or alerts.

In some embodiments, data records can be sent from participant institutions either in real time (as a data record is generated), or in batch mode. A message (such as a duplicate entry alert) can be returned in real time, informing the institution if the data record has been matched to one or more previously stored data records. As will be described later in greater detail, the detection system may also return other information such as a risk score associated with the duplicative data record.

In other instances, an institution, may submit data records in batch form, say, at the end of each day. Such data records could each be reviewed against previous data records submitted for review in a batch form, as well as data records for which records have been previously submitted in real time for review by the detection system.

As will also be described later, in some embodiments a process for determining whether a duplicate data record is an improper duplicate may involve more than checking for matches. For example, in some circumstances, a data record may be inadvertently processed or entered twice when received at a particular entity. For example, an employee (or other user interacting with the entity) may enter the data record more than once. Such entry may be inadvertent or intentional. In other circumstances, some records may be intended to be duplicative, such as inventory records where multiple items having a same identifier are tracked. Accordingly, in some embodiments of the invention, features are provided for filtering out or excluding certain duplicate data records from being identified as improper duplicates. In yet other embodiments, features are provided that assess the risk that a duplicate data record is improper duplicate (based on factors and/or circumstances surrounding the data record, as well as on preferences and/or rules set by the entity associated with the duplicate entry) and providing a risk score to the participating institution, either in lieu of or in addition to indicating whether or not the data record is a duplicate.

Also, in some embodiments the duplicate detection system can be used in conjunction with other systems for assessing risk or detecting improper activity. Thus, embodiments herein can be used with systems for assessing the risk of duplicate records of data, such as exemplified in U.S. Patent Publication No. 2013/0013491, the entire disclosure of which is incorporated herein by reference.

Turning now to the drawings, there is shown in FIG. 1 an exemplary network 100 in which a duplicate data record detection system 110 is connected for data records from one or more institutions 120. As illustrated, the institutions 120 may include entities such as businesses, colleges, and/or other networked computer systems that may interface with a duplicate data record detection system 110. Institutions 120 and detection system 110 may be in communication with one another over one or more networks. In some embodiments, the one or more networks includes a private, secure network that is established for facilitating secure communications between the various devices of network 100 to protect any sensitive data communicated between the parties. It should be appreciated that the institutions 120 illustrated in FIG. 1 are only exemplary and not exclusive.

While the duplicate data record detection system 110 is illustrated as separate from each of the institutions 120 (and thus operated by a third party/entity apart from one of the institutions 120, as might be desirable in order to maintain an relationship independent from any one of the institutions), there are various alternate ways of operating the system 110, including the system being operated by one of the institutions 120.

The detection system 110 includes a processing system 130 and a data storage or memory device 140. The processing system 130 manages data that is received at system 110 and stores such data at storage device 140. The processing system 110 also compares data records received from the institutions 120 against data records already stored in storage device 140 in order to identify duplicative data records that are improper (or potentially improper), and generates alerts or notifications that provide notice back to institutions 120 that might receive (or be affected by) duplicative data records.

Figure 2:
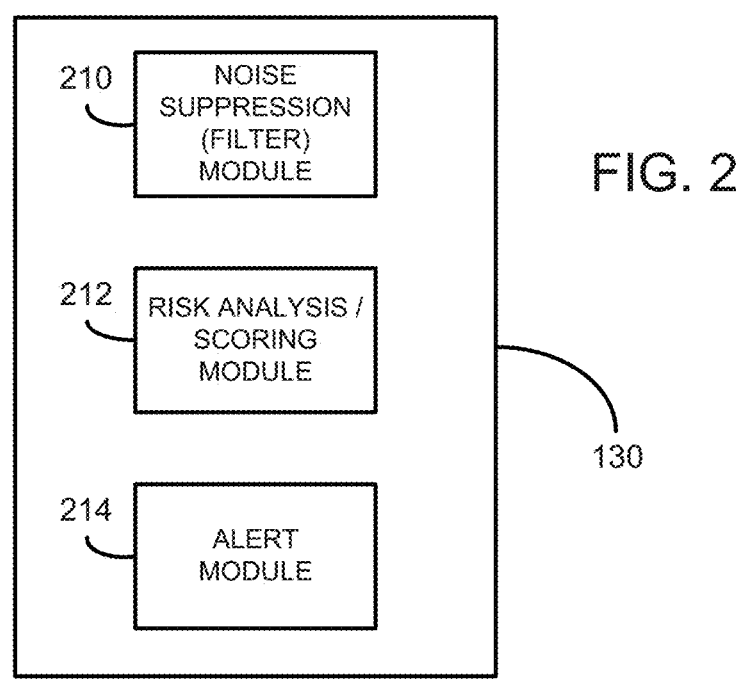
FIG. 2 illustrates exemplary functional modules within the processing system of the duplicate record detection system.

FIG. 2 illustrates certain functional features carried out by processing system 130 in order to detect and identify duplicate data records, and in particular illustrates those features as three programmed modules. It should be appreciated that in some embodiments the modules might represent executable software resident within internal memory of the processing system 130, and in other embodiments the modules might be downloaded from external memory devices (such as storage device 140) for execution at processing system 130. Other ways of implementing the modules in hardware and/or software are also possible.

The modules within processing system 130 include a noise suppression (filter) module 210, a risk analysis/scoring module 212, and an alert module 214. Many of the specific functional features provided by these modules will be described later in conjunction with FIGS. 3 and 4. However, briefly, noise suppression module 210 provide filters that, when enabled, will exclude or suppress certain data records from being identified as improper duplicates (e.g., when those data records have characteristics that are determined to likely provide false positives, i.e., tracking multiple items with a same identifier). Risk analysis/scoring module 212 examines characteristics of duplicative data records and assesses the likelihood that a data record is in fact duplicative, and in some embodiments, provides a score that reflects the degree of likelihood. Alert module 214 provides an alert or notification to one or more of the institutions 120 when a record of a data record received at system 110 is determined to be (or likely to be) a duplicate and, hence, potentially improper. As should appreciated, the functionality generally depicted as being allocated to the three identified modules 210, 212 and 214 is so depicted for ease of description in illustrating some notable features of the invention, and various features necessary or desirable for implementation in those three modules could be combined into fewer than three modules or separated into more than three modules.

Figure 3:
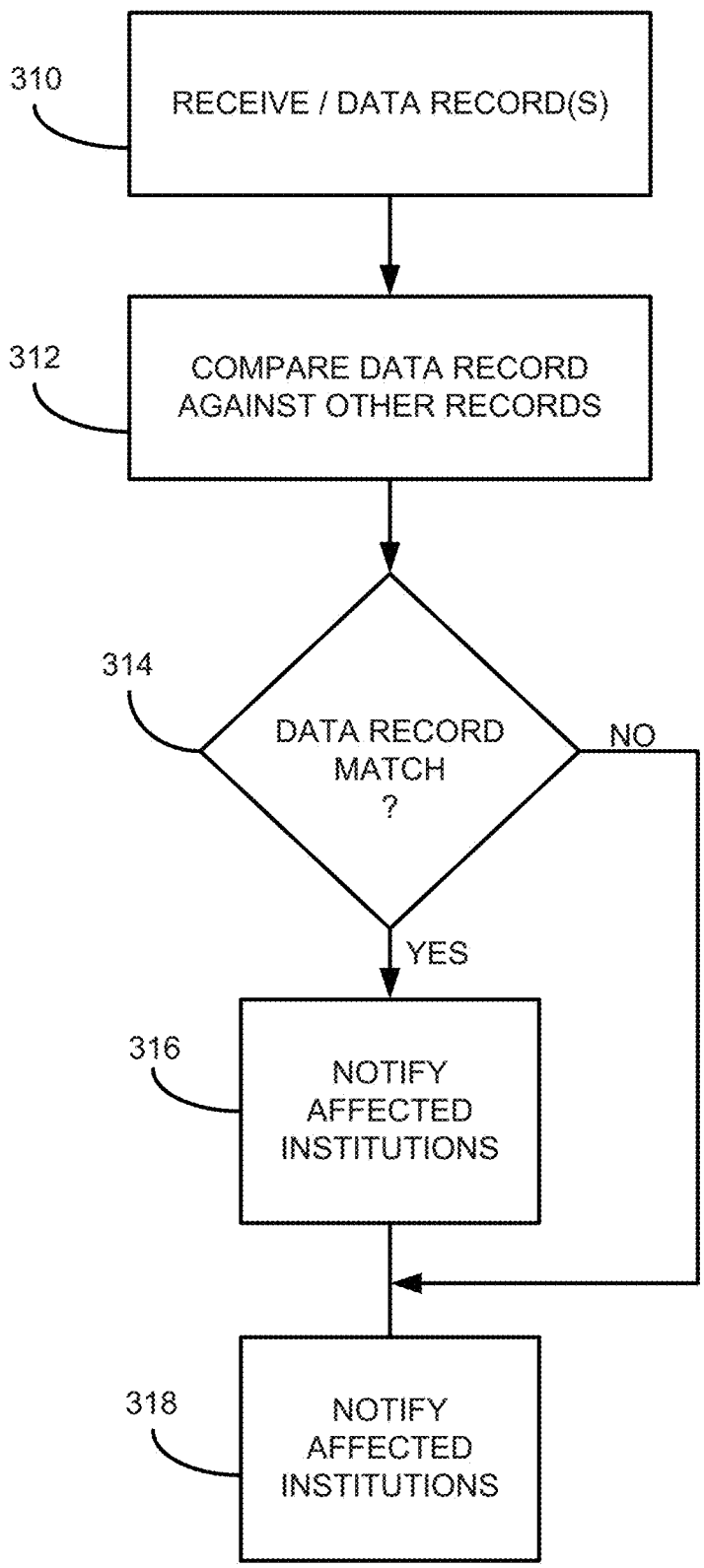
FIG. 3 illustrates a process for detecting duplicate data records in the network of FIG. 1.

FIG. 3 is a simplified flow diagram illustrating the general operation of the system 110 in detecting and identifying duplicate data records, in accordance with one embodiment of the invention. As seen, the system 110 receives from the institutions 120 data records, step 310. As described earlier, in some instances the receipt of a data record, such as at step 310, may represent receipt of a single data record for a single item, e.g., resulting from real time submission of the particular data record to the alert system by one of the institutions at the time the data record is conducted. In other cases, a group of data records may be received together, such as when a large number of data records are provided in batch mode (e.g., at the end of each day).

At step 312, each newly received data record is compared against other data records (such as previously submitted/stored data records) by comparing a data record received at system 110 against other data records stored at memory device 140. If there is a match, step 314, then the processing system 130 generates alerts to notify any institutions affected by the duplicate data records, step 316. If there is no match at step 314, or if there is a match and after notifications are sent at step 316, the current data record is stored (for comparison against future data records), step 318. It should be noted that the notifications sent at step 316 can be generated for distribution in various ways. In one embodiment, an alert is sent to the institution providing the current data record that gave rise to the match (i.e., the record that was matched against a previous data record), and an alert is also sent to the institution that provided the previous (matched) data record. In some embodiments, multiple entities may be affected by a duplicate data file, such as when multiple entities cooperate to achieve networked results. It should be noted that in many circumstances multiple institutions be alerted about the match, since each may be impacted by an improper duplicate data record.

In other embodiments, the processing system could generate alerts to only the institution providing the most recent data record (that gave rise to the match against a prior data record).

Figure 4:
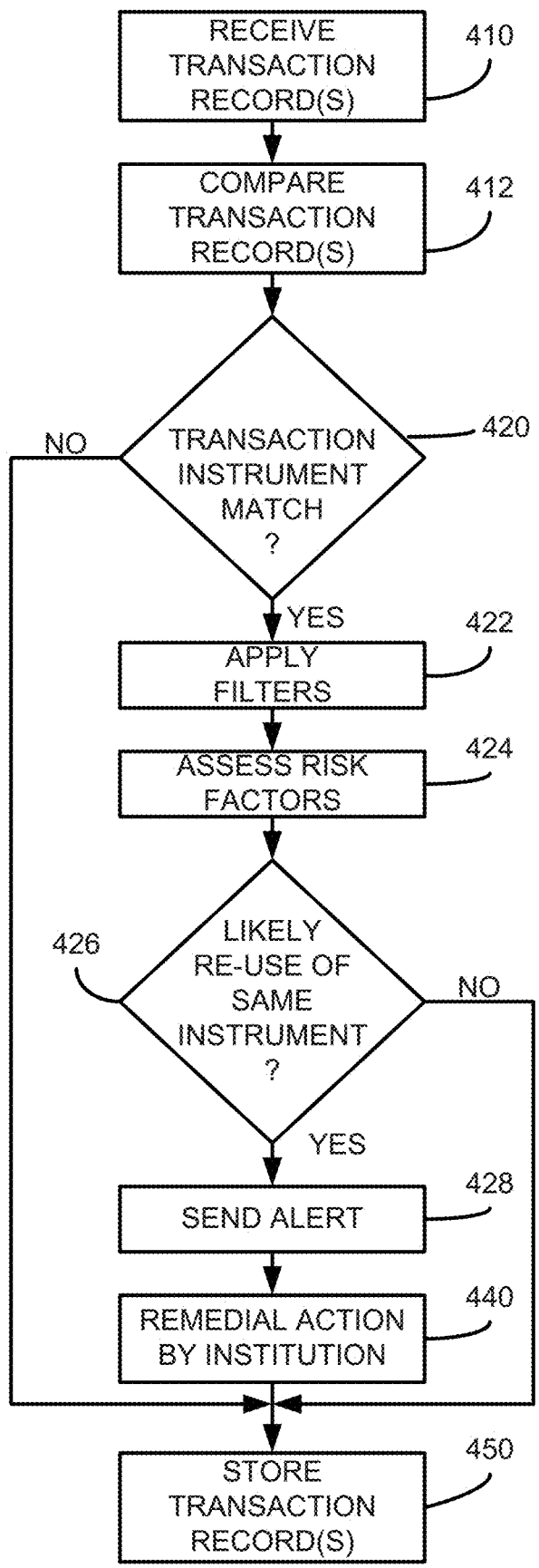
FIG. 4 illustrates an alternative process for detecting duplicate data records.

FIG. 4 is a flow diagram illustrating yet another embodiment in which filters are applied, risk factors associated with the match of two data records are assessed, and notifications are generated in accordance with that assessment. In such embodiment, a data record is received at step 410 and compared against prior data records at step 412. If there is no match (step 420), the received data record is stored (step 450). If there is a match at step 420, then the processing system applies filters to the match (using noise suppression module 210) to eliminate data records that might give rise to a false match, step 422. Filters may be specified by each institution and/or may be based on previous experience regarding what types of data records are likely to be duplicates and/or improper. As another example of filtering, an institution submitting a data record for review might request only alerts for certain types of data records since the institution may consider the risk of improper duplicates of certain types of data records. Types of data records are referred to herein as channel indicator types.

In accordance with another embodiment, at step 424 the processing system could then assess risk factors that might be associated with a duplicate data records or with the circumstances surrounding its match to an earlier data record, using risk scoring/analysis module 212. Examples of factors that might be assessed at step 424 include a type of the data record, a timing of the duplicate entries, source information for the duplicate entries, historical data related to a particular data type, user, entity, or location, and the like.

The exemplary factors above (as well as other factors) could be considered together and weighted equally or differently to assess risk. Different participating institutions may assign different weights to different factors, and in some cases the institutions using the risk data will choose different weights depending on their own experiences or their risk tolerance. For example, data could be collected and then statistically reviewed to identify patterns of events which predict an outcome. For example, the design of a risk model could be based on analysis of large numbers of past data records and the characteristics of such data records. Based on that empirical and experiential data, predictive data can be generated as to how any given set of circumstances surrounding a data record might predict the future risk of duplicate data records. The predictive characteristics are identified and then built into a model within module 212. In alternative embodiments, neural models or rules models may be used instead of statistical models.

Also, channel indicator types (indicating the manner in which the data record is presented to an institution) could be used to assess risk (in addition to use in filtering out matches as described earlier in connection with step 422). For example, data records submitted remotely (such as from a remote device of a user) could be assigned a greater risk weight. In some circumstances the channel indicator types for both the later matching data record and the earlier data record (against which the later data record was matched) could be used. For example, when both the earlier and the later (duplicate) data record were submitted remotely, the risk could be weighted higher. If the earlier data record were submitted in person at a device of the entity and then the later data record were submitted remotely, then the risk could be assessed and weighted much higher in some circumstances. In other circumstances, such a factor could be weighted much lower.

After the risk factors have been assessed, the processing system determines (perhaps based on a score generated at step 424) whether the duplicate data records are likely improper, step 426, and if so, an alert (or multiple alerts to different institutions) are generated at alert module 214 and sent by the system 110, step 428. It should be appreciated that in sending an alert, a risk score could also be sent to each affected institution, to permit the institution to better understand the risk and determine what kind of remedial action to take, step 440. Finally, in FIG. 4, the data record submitted for review is stored at a data storage device (such as device 140).

Embodiments of the invention are directed to an alert system where institutions, such as institutions 120, receive customized alerts on their computer systems. The systems and methods may provide techniques for notifying institutions of possible duplicate records in real-time, as the ability to rectify duplicative data entries may be time sensitive, especially if the duplicative entry was intentional, yet improper. The present invention also may operate on a private, secured network (such as a private LAN or WLAN), with data transmissions being encrypted for additional security. For example, alerts may be encrypted to prevent the communications (which may identify sensitive information related to a particular item or person) from being read if intercepted by an unintended party. Further, the present invention allows each institution to set preferences on how alerts are generated and transmitted. For example, during enrollment in the alert system, each institution may provide preference information related to a preferred data, channel indicator types for which alerts should be sent, risk factors, and/or other alert preferences. The institution may also provide a communication destination address of a remote computing device (e.g., a number for a cellular phone, pager or PDA, short message service (SMS) handle, email address, URL for a website associated with the institution, and the like), which may be used to direct communications from the alert system and/or other institutions. This allows each institution to customize how a level of risk is determined, when to get alerts, the content of alerts, and/or the format of the alerts. The alert system uses a computing system (such as processing system 130) to receive data from a data source, such as one of the institutions, and send selected data, such as alerts, to other institutions. The computing device includes a memory, a network interface including at least a transmitter and/or a receiver, and a microprocessor.

In some embodiments, the alert system may provide an alert software application, mobile application, and/or application programming interface (API) to each institution that allows a remote computing device of each institution to communicate with the alert system. For example, the alert system may provide software to an institution that may be downloaded and/or installed on the remote computing device of each institution. Once an institution enrolls or otherwise begins using the alert system, the alert system receives data records that identify instruments being presented at the one or more institutions sent from a data source to the computing system. The computing system filters the data records based upon the institution preference information that is stored in memory on the computing device. That is, the computing device compares instruments associated with each of the received data records to instruments associated with stored data records. Next, an alert is built containing the risk score, type of improper use, communication address of a source of the duplicate entry (such as an address of the entity that submitted the duplicate entry a universal resource locator (URL) to a web page, an email address, short message service (SMS) handle, phone number, and/or other address that may allow the remote device to communicate with the data source from which the duplicate data record is received) and/or other information related to the particular data record and affected institutions.

The alert may then formatted into a desired format based upon the alert format preference information associated with an intended recipient institution. Subsequently, the formatted alerts are transmitted to one or more remote computing devices of one or more of the institutions in accordance with the alert preferences and risk models. The alert, risk score, and information contained therein may be used by each institution to determine how to mitigate or otherwise handle a possible incidence of a duplicate data record. In some embodiments, after receiving the alert, the institution can use the communication address to contact another affected institution using its own remote computing device. The alert causes the remote computing device of the recipient institution to automatically display the alert, such as by displaying a push notification or other indication using software associated with the alert system. The generation, transmission, and display of the alert may be done in real-time to minimize the time needed by the entity to detect and rectify an instance of an improper duplicate entry. In some embodiments, the alert system may auto-launch the alert software and/or mobile application provided by the alert system to display the alert. When connected to the Internet or other communications network, the recipient institution may then click on the URL or other address in the alert to use the alert software, mobile application, browser, and/or messaging service to communicate with the data source or other affected institution regarding the particular alert.

By providing an alert that causes the alert to be automatically displayed on the remote computing device in real-time to address Internet-centric problems that arose after the invention of remote data submission using personal wireless devices, such as digital image deposits and other forms of electronic presentation of instruments. Specifically, embodiments of the invention address these Internet-centric issues by providing real-time alerts that automatically cause extremely time sensitive information (the alert) to display on a remote computing device of an institution immediately upon detection of a second presentation attempt or other detected behavior that has a high risk of being improper. In some embodiments, this alerting may be done in real-time even if the remote computing device is offline or not currently running an instance of the alert software or mobile application. This allows the present invention to address a further Internet-centric challenge of alerting an institution with time sensitive information, even if the institution is offline. This challenge is addressed by transmitting the alert over a network communication channel, such as a wireless network, to activate the alert application or other software application, which causes the alert to display. The alert also may enable the connection of the remote computing device to the data source of the duplicative data record over a network when the remote computing device comes online and/or otherwise opens the alert application or other software application. Additionally, the use of private, secured networks to send and receive encrypted data records and alerts ensures that any sensitive data stored on the data records and alerts (such as account numbers, personal identification, and the like) may not be read by unintended interceptors of the data.

Turning to FIG. 7, a simplified flow diagram illustrating a process 700 for providing alerts over a network to a remote computing device is shown. Process 700 may be performed using an alert system (such as system 110) and may contain any of the features described in relation to processes 300 and/or 400 described herein. At block 710, a computing device of the alert system (such as processing system 130) receives from a number of institutions (such as institutions 120) data records. The data records may, for example, contain data such as data that identifies instruments that have been presented or items used at one or more of the institutions. The data records may be received over a secure, private network, such as a LAN or WLAN or other private network that is established to facilitate communication between the alert system and parties interacting with the alert system. In some embodiments, each of the data records may be received from an institution in real-time, such as immediately upon the institution generating the data record itself. Such real-time reporting helps minimize the amount of time that lapses before a duplicate entry is detected and the affected entity is alerted. As described earlier, in some instances the receipt of a data record may represent receipt of a single data record, while in other cases, large batches of data records may be received together.

In some embodiments, the data records may be encrypted to protect any sensitive information included in the records. For example, the institution providing the data record may encrypt the data record using one key of an asymmetric key pair. Upon receiving the encrypted data record, the computing device of the alert system may decrypt the data record, such as by using the other key of the asymmetric key pair. The computing device may parse the decrypted data record to identify a data string that identifies a particular instrument.

In some embodiments, the memory of the computing device may include risk factor preferences, data format preferences, and/or alert preferences for each of one or more institutions. Such information may be provided by each institution upon enrollment or other initialization with the alert system and allows alerts to be customized for each institution. The memory may also store a communication address of each of the institutions. This communication address may include an email address, a universal resource locator (URL), a short message service (SMS) handle, a phone number, and/or other identifier that may be used to direct an electronic communication to a particular institution.

At block 712, each received data record may be stored on the memory of the computing device. At block 714, the receive data records may be filtered by comparing each received data record (or data string identifying a particular instrument) to other data records stored at the computing system (which may be retrieved by the computing device) to determine if any of the received data records are duplicates. For example, each instrument (or data string identifying the instrument) associated with the received data records may be checked against the other instruments associated with the stored data records to ensure that there are no instruments that have been presented multiline times. If no duplicates are found, the alert system may continue its normal operation of receiving and comparing new data records against stored data records. If there a duplicate is detected, the alert system may generate a alert that is indicative of a likelihood of an improper duplicate data record associated with the data string from the filtered data records at block 716. The alert may contain an institution identifier and/or specify a source of the duplicate data record. The computing device may identify any institutions affected by the duplicate data record and may use the identified institutions to determine which institutions should receive the alert. In some embodiments, a determination of whether to generate an alert for a particular institution may be based on a channel indicator type associated with the offending data record. For example a particular institution may only want to be alerted where at least one of the duplicate data records was submitted by a user with their personal wireless device, while another institution wishes to be alerted upon any type of possible duplicate data records. This allows each institution to customize when they get alerts. In some embodiments, the alert may include an indication of the channel indicator type, which may be used by the alerted institution to determine what actions it should take to mitigate or otherwise address the particular instance of improper duplicate data record. In some embodiments, each institution may have its own preferences for a particular data format for the alert (which may be established upon enrollment). In such cases, the computing device may format the alert according to the preferences of the intended recipient institution. The format of the alert may be driven by the hardware and software capabilities of the remote device of the recipient institution. In some embodiments, the desired format may be based on the type of duplicate data record contained within the alert.

It should be noted that the notifications can be generated for distribution in various ways. In one embodiment, an alert is sent to the institution providing the current data record that gave rise to the match (i.e., the record that was matched against a previous data record), and an alert is also sent to the institution that provided the previous (matched) data record. In other embodiments, the computing device may generate alerts to only the institution providing the most recent data record, or alternatively generate alerts to all affected institutions.

In some embodiments, if there is a duplicate detected, then the computing device applies filters to the match (such as using noise suppression module 210) to eliminate data records that might give rise to a false match as described in relation to process 400. For example, an institution submitting a data record for review might request only alerts for certain types of data record duplicates (such as remote submissions by users' personal wireless devices).

At block 718, the computing device may assess risk factors that the identified duplicate data record is improper (such as by using risk scoring/analysis module 212). Each institution may have its own set of preferences of risk factors, including which risk factors to consider and how to weight each risk factor. These factors may be used to generate a risk score that may be included with or as part of the alert and may be used by the alerted institution to mitigate and/or otherwise handle the possible duplication error as described in greater detail in process 400.

At block 720, the alert (or multiple alerts to different institutions) may be sent by the computing device to at least one remote computing device associated with one or more of the institutions. It should be appreciated that in sending an alert, a risk score or other risk assessment could also be sent to each affected institution, to permit the institution to better understand the risk and determine what kind of remedial action to take. The transmitted alert may cause the alert to display on the at least one remote computing device. For example, the alert causes the remote computing device to automatically display the alert. In some embodiments, the generation, transmission, and display of the alert on the remote computing device may be done in real-time to provide affected institutions a maximum opportunity to mitigate and/or otherwise address a particular situation. In some embodiments, prior to transmitting the alert, the alert may be encrypted, such as by using one of the keys of the asymmetric key pair. This helps protect any sensitive data included on the alert. To further enhance the security of the data, the alert may be transmitted over the private, secured network that is established specifically for use by the alert system and the devices interacting therewith.

In some embodiments, the remote computing device may be the institution data source. In other words, the device being alerted of the potential duplicate data record use of an instrument may be the device that provided the newly received data record that was determined to be a duplicate. In some embodiments, the alert may include the communication address of the source of the particular data record that triggered the alert (or other affected institution that is different than the recipient institution). This allows the recipient institution to click on, otherwise interact with, and/or otherwise use the communication address to establish a networked communication connection with the source of the particular data record (or other affected institution). For example, clicking the communication address may open an email composition window on the remote computing device that may be used to communicate with the source. Such techniques not only allow for real-time alerting of potentially improper duplicate data records, but provide quick processes for contacting other institutions to better understand and react to a possible improper duplication.

Figure 6:
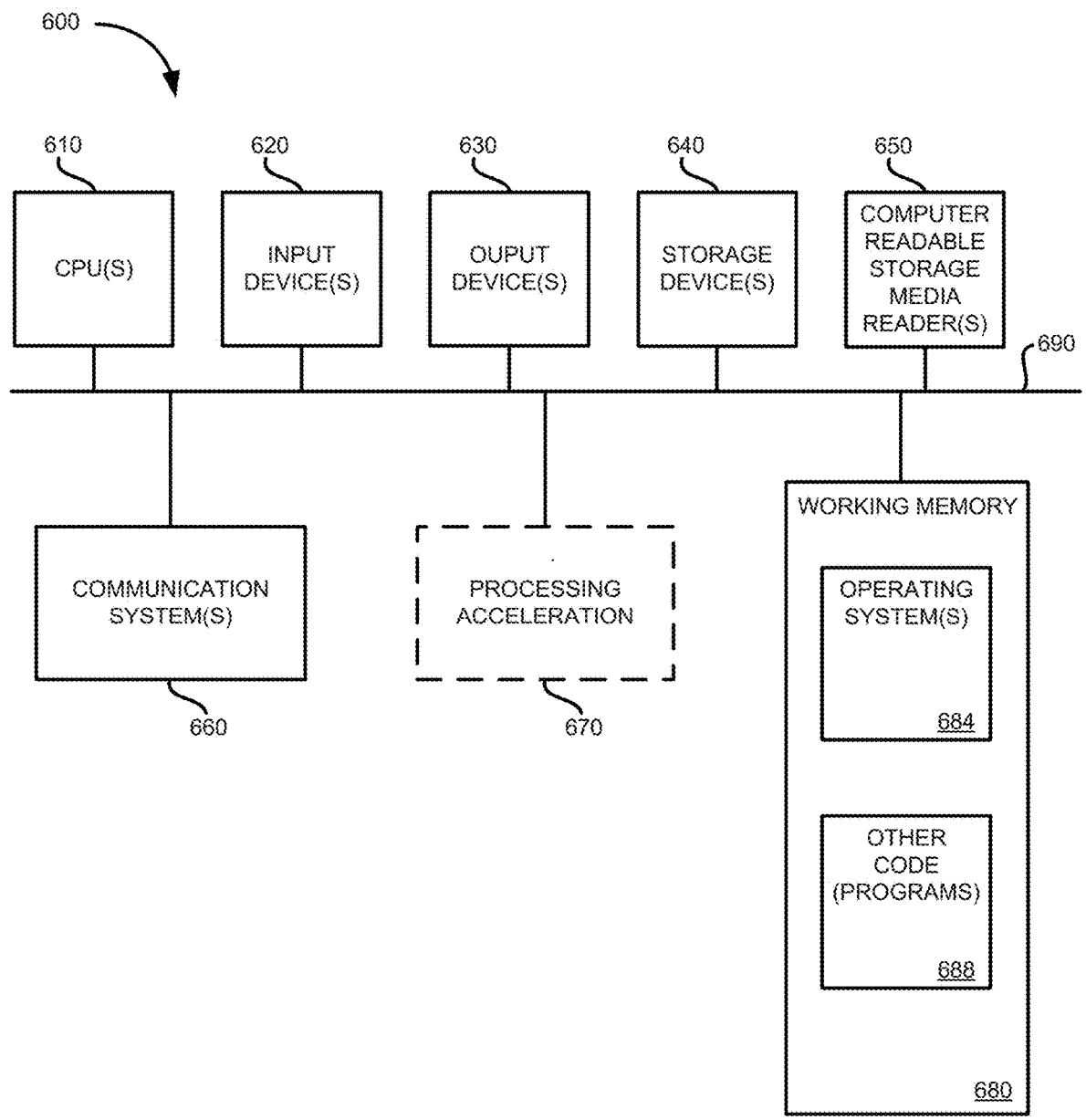
FIG. 6 is a block diagram illustrating an exemplary computer system upon which embodiments of the invention may be implemented.

FIG. 6 is a block diagram illustrating an exemplary computer system upon which embodiments of the present invention may be implemented. This example illustrates a computer system 600 such as may be used, in whole, in part, or with various modifications, to provide the functions of the duplicate data record detection system 110, as well as other components and functions of the invention described herein.

The computer system 600 is shown comprising hardware elements that may be electrically coupled via a bus 690. The hardware elements may include one or more central processing units 610, one or more input devices 620 (e.g., a mouse, a keyboard, etc.), and one or more output devices 630 (e.g., a display device, a printer, etc.). The computer system 600 may also include one or more storage devices 640, representing remote, local, fixed, and/or removable storage devices and storage media for temporarily and/or more permanently containing computer-readable information, and one or more storage media reader(s) 650 for accessing the storage device(s) 640. By way of example, storage device(s) 640 may be disk drives, optical storage devices, solid-state storage device such as a random access memory ("RAM") and/or a read-only memory ("ROM"), which can be programmable, flash-updateable or the like.

The computer system 600 may additionally include a communications system 660 (e.g., a modem, a network card—wireless or wired, an infra-red communication device, a Bluetooth™ device, a near field communications (NFC) device, a cellular communication device, etc.). The communications system 660 may permit data to be exchanged with a network, system, computer, mobile device and/or other component as described earlier. The system 600 also includes working memory 680, which may include RAM and ROM devices as described above. In some embodiments, the computer system 600 may also include a processing acceleration unit 670, which can include a digital signal processor, a special-purpose processor and/or the like.

The computer system 600 may also comprise software elements, shown as being located within a working memory 680, including an operating system 684 and/or other code 688. Software code 688 may be used for implementing functions of various elements of the architecture as described herein. For example, software stored on and/or executed by a computer system, such as system 600, can be used in implementing the processes seen in FIGS. 3 and 4.

It should be appreciated that alternative embodiments of a computer system 600 may have numerous variations from that described above. For example, customized hardware might also be used and/or particular elements might be implemented in hardware, software 25 (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the duplicate data record detection system 110 may be implemented by a single system having one or more storage device and processing elements. As another example, the system 110 may be implemented by plural systems, with its respective functions distributed across different systems either in one location or across a plurality of linked locations.

Figure 5:
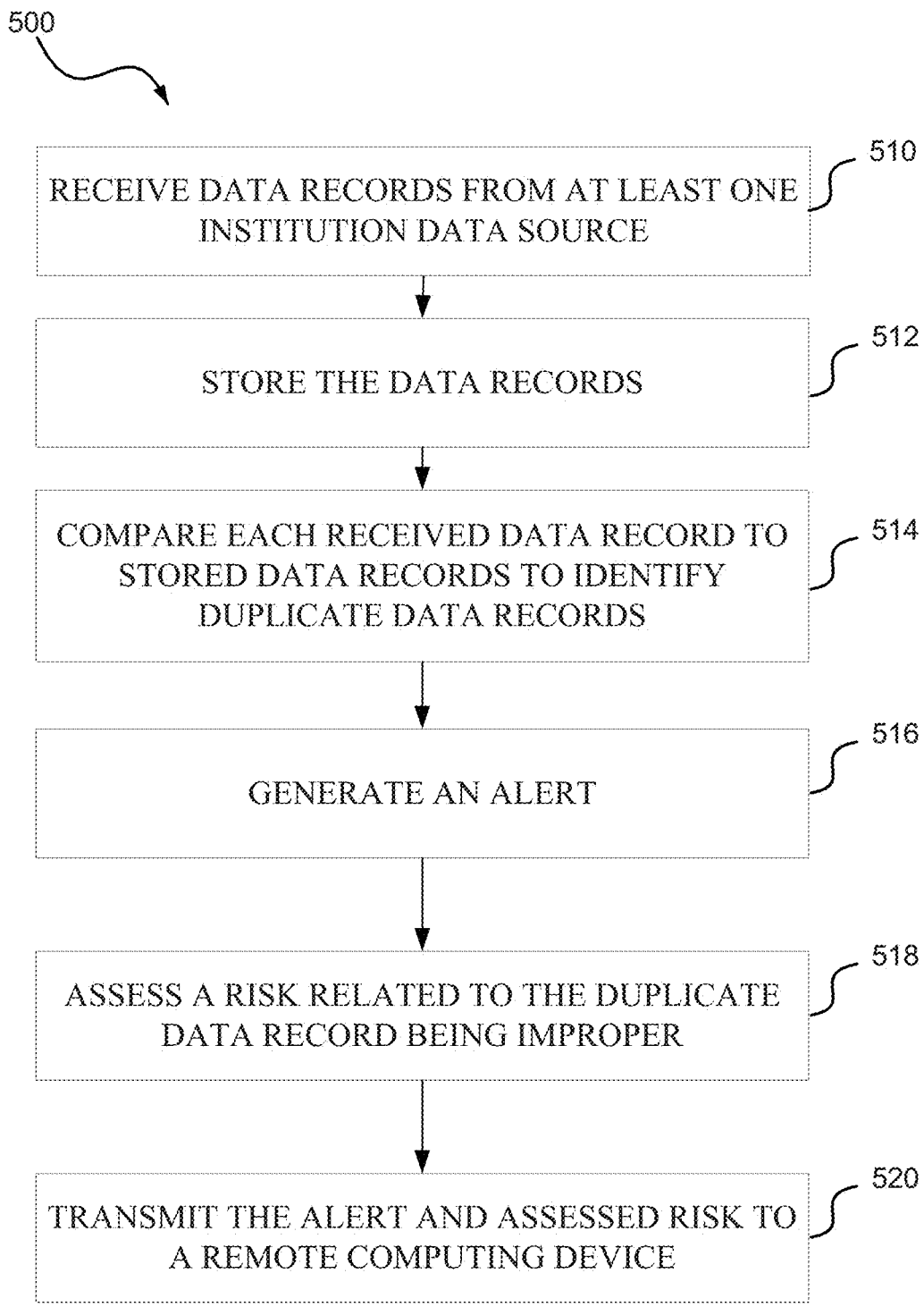
FIG. 5 illustrates a processing for providing alerts over a network to a remote computing device according to embodiments.

Moreover, while the various flows and processes described herein (e.g., those illustrated in FIGS. 3-5) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise.

Consequently, although the invention has been described with respect to exemplary embodiments, it will be appreciated that the invention is intended to cover all modifications and equivalents within the scope of the following claims.

What is claimed is:

1. A method of providing alerts over a network to a remote computing device, the method comprising:
   receiving data records in real-time at a computer system sent from at least one institution data source over a network, the data records identifying instruments being presented at one or more institutions, including an indication of a type of presentment at the one or more institutions as represented by the data records, the computer system comprising a microprocessor and a memory that stores risk factor preferences and alert preferences for each of the one or more institutions, wherein the microprocessor:
   stores the data records;
   filters the received data records by comparing each received data record to other data records stored at the computing system to determine if any of the received data records identifies the same instrument that is identified in any of the other stored data records;

generates an alert from the filtered data records that contains an institution identifier, which specifies a source of a particular data record that identifies the same instrument that is identified in any of the other stored data records;

assesses a risk that the identified same instrument is being used improperly, wherein the assessment of risk is based, at least in part, on a channel indicator type that indicates a manner in which the particular data record was presented to a particular financial institution;

encrypts the alert using one key of an asymmetric key pair; and upon encrypting the alert, transmits the alert and the assessed risk in real-time over a network communication channel to at least one remote computing device associated with at least one of the one or more institutions based upon the risk factor preferences and alert preferences, wherein the alert causes the alert to display on the at least one remote computing device.

2. The method of providing alerts over a network to a remote computing device of claim 1, wherein:
the at least one remote computing device comprises the at least one institution data source.

3. The method of providing alerts over network to a remote computing device of claim 1, wherein:
the alert comprises a channel risk type.

4. The method of providing alerts over a network to a remote computing device of claim 1, wherein:
the data records are encrypted using one key of an asymmetric key pair; and
the microprocessor further decrypts the encrypted data records using another key of the asymmetric key pair.

5. The method of providing alerts over a network to a remote computing device of claim 1, wherein:
the alert is provided to each of the institutions where the identified instrument has been presented.

6. The method of providing alerts over a network to a remote computing device of claim 1, wherein:
the memory further stores a communication address of each of the one or more institutions; and
the alert further comprises the communication address of the at least one of the one or more institutions associated with the source of the particular data record.

7. The method of providing alerts over a network to a remote computing device of claim 6, wherein:
the communication address comprises an email address, universal resource locator (URL), or short message service (SMS) handle; and
the alert causes the at least one remote computing device to enable a communication connection via the communication address to the source of the particular data record over the network.

8. The method of providing alerts over a network to a remote computing device of claim 1, wherein:
the memory further stores a preference for an alert format for each of the one or more institutions; and
the microprocessor further formats the alert into a particular data format according to the preference for the alert format of the at least one of the one or more institutions associated with the at least one remote computing device.

9. The method of providing alerts over a network to a remote computing device of claim 1, wherein:
the transmitted assessed risk comprises at least a risk score associated with the particular data record, wherein the risk score is based on at least one risk factor preference of the risk factor preferences.

10. The method of providing alerts over a network to a remote computing device of claim 9, wherein:
the alert further comprises the risk score.

11. A system for providing alerts over a network to a remote computing device, comprising:
a network interface;
at least one processing device; and
at least one memory device, the at least one memory device being configured to store risk factor preferences and alert preferences for each of one or more institutions, wherein the at least one memory device comprises instructions that cause the at least one processing device to:
receive data records sent in real-time from at least one institution data source over a network using the network interface, the data records identifying instruments being presented at the one or more institutions, including an indication of a type of presentment at the one or more institutions as represented by the data records;
store the data records;
filter the received data records by comparing each received data record to other data records stored at a database of the system to determine if any of the received data records identifies the same instrument that is identified in any of the other stored data records;
generate an alert from the filtered data records that contains an institution identifier, which specifies a source of a particular data record that identifies the same instrument that is identified in any of the other stored data records;
assess a risk that the identified same instrument is being used improperly, wherein the assessment of risk is based, at least in part, on a channel indicator type that indicates a manner in which the particular data record was presented to a particular financial institution;
encrypts the alert using one key of an asymmetric key pair; and
upon encrypting the alert, transmit, using the network interface, the alert and the assessed risk in real-time over a network communication channel to at least one remote computing device associated with at least one of the one or more institutions based upon the risk factor preferences and alert preferences,
wherein the alert causes the alert to display on the at least one remote computing device.

12. The system for providing alerts over a network to a remote computing device of claim 11, wherein:
the at least one remote computing device comprises the at least one institution data source.

13. The system for providing alerts over a network to a remote computing device of claim 11, wherein:
the alert comprises a channel risk type.

14. The system for providing alerts over a network to a remote computing device of claim 11, wherein:
the data records are encrypted using one key of an asymmetric key pair; and the instructions cause the at least one processing device to decrypt the encrypted data records using another key of the asymmetric key pair.

15. The system for providing alerts over a network to a remote computing device of claim 11, wherein:

the alert is provided to each of the institutions where the identified instrument has been presented.

16. The system for providing alerts over a network to a remote computing device of claim 11, wherein:

the at least one memory device further stores a communication address of each of the one or more institutions; and the alert further comprises the communication address of the at least one of the one or more institutions associated with the source of the particular data record.

17. The system for providing alerts over a network to a remote computing device of claim 16, wherein:

the communication address comprises an email address, universal resource locator (URL), or short message service (SMS) handle; and the alert causes the at least one remote computing device to enable a communication connection via the communication address to the source of the particular data record over the network.

18. The system for providing alerts over a network to a remote computing device of claim 11, wherein:

the at least one memory device further stores a preference for an alert format for each of the one or more institutions; and the instructions further cause the at least one processing device to format the alert into a particular data format according to the preference for the alert format of the at least one of the one or more institutions associated with the at least one remote computing device.

19. The system for providing alerts over a network to a remote computing device of claim 11, wherein:

the transmitted assessed risk comprises at least a risk score associated with the particular data record, wherein the risk score is based on at least one risk factor preference of the risk factor preferences.

20. The system for providing alerts over a network to a remote computing device of claim 19, wherein:

the alert further comprises the risk score.

* * * * *